United States Patent
Roschuk et al.

(10) Patent No.: US 10,830,930 B1
(45) Date of Patent: Nov. 10, 2020

(54) ANTIREFLECTIVE INFRARED CUT FILTER COATINGS FOR ELECTRONIC DEVICES

(71) Applicant: Apple Inc., Cupertino, CA (US)

(72) Inventors: Tyler R. Roschuk, Cupertino, CA (US); Jun Li, Dongguan (CN); Biao Qi, Santa Clara, CA (US); Justin L. Laird, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/564,594

(22) Filed: Sep. 9, 2019

(51) Int. Cl.
*G02B 5/20* (2006.01)
*G02B 5/28* (2006.01)
*G02B 1/115* (2015.01)

(52) U.S. Cl.
CPC .............. *G02B 5/208* (2013.01); *G02B 1/115* (2013.01); *G02B 5/207* (2013.01); *G02B 5/281* (2013.01)

(58) Field of Classification Search
None
See application file for complete search history.

(56) References Cited

U.S. PATENT DOCUMENTS

| | | | |
|---|---|---|---|
| 5,944,964 A | 8/1999 | Solberg et al. | |
| 6,686,049 B1* | 2/2004 | Nakamura | C03C 17/008 428/428 |
| 8,481,148 B2 | 7/2013 | Adachi et al. | |
| 9,366,784 B2 | 6/2016 | Bellman et al. | |
| 9,594,275 B2 | 3/2017 | Koike et al. | |
| 9,720,142 B2 | 8/2017 | Furusato | |
| 9,995,852 B2 | 6/2018 | Imamura et al. | |
| 2001/0043330 A1* | 11/2001 | Jung | G01J 3/51 356/419 |
| 2013/0271836 A1* | 10/2013 | Fukaya | C03C 17/3452 359/507 |
| 2018/0081085 A1 | 3/2018 | Ge et al. | |
| 2019/0171039 A1 | 6/2019 | Ding et al. | |
| 2019/0219751 A1* | 7/2019 | Barrett | G02B 5/223 |
| 2019/0219843 A1 | 7/2019 | Ogo | |

FOREIGN PATENT DOCUMENTS

KR 20060061478 A * 6/2006
WO 2019017228 A1 1/2019

OTHER PUBLICATIONS

Reference from Derwent Acc No. 2007-136105 (Year: 2007).*

* cited by examiner

*Primary Examiner* — Vip Patel
(74) *Attorney, Agent, or Firm* — Treyz Law Group, P.C.; David K. Cole

(57) ABSTRACT

An antireflective infrared cut filter coating may be applied on transparent substrates within electronic devices, such as sapphire or glass substrates. The transparent substrates may be windows for optical components or may be cover glasses for displays. The antireflective infrared cut filter coating may be formed from a thin-film interference filter having a plurality of thin-film layers of varying materials and thicknesses. The antireflective infrared cut filter coating may transmit light neutrally across visible wavelengths and may reflect infrared light. In this way, the antireflective infrared cut filter coating may reduce unwanted infrared light from reaching underlying optical components, such as wide-angle cameras, thereby reducing undesirable artifacts in images generated by the components.

21 Claims, 8 Drawing Sheets

US 10,830,930 B1

ANTIREFLECTIVE INFRARED CUT FILTER COATINGS FOR ELECTRONIC DEVICES

BACKGROUND

This relates generally to coatings for optical component windows in electronic devices, and more particularly, to antireflective infrared cut filter coatings for the component windows.

Electronic devices such as cellular telephones, computers, watches, and other devices contain transparent members such as display cover layers and camera windows. Transparent members such as these may be prone to undesired light reflections. Light reflections in display cover layers can obscure images that are being presented on a display. Light reflections in camera windows can create undesired image artifacts and negatively affect image color quality and uniformity.

Light reflections such as these arise because there is an index of refraction difference between the material from which a transparent member is formed and surrounding air. To help reduce reflections, transparent members may be provided with antireflection coatings formed from a stack of alternating high-index-of-refraction and low-index-of-refraction dielectric layers. These antireflection coatings may be sensitive to angular orientation. Moreover, the antireflection coatings may allow infrared light to pass through to underlying components, such as cameras and other optical components, which may be sensitive to infrared light.

It would therefore be desirable to be able to provide improved antireflective infrared cut filter coatings for transparent members in electronic devices.

SUMMARY

An electronic device may be provided with a transparent member such as a display cover layer or a camera window. The transparent member may be formed from a crystalline material such as sapphire or may be formed from other transparent material, such as glass. A thin-film interference filter may be formed on the transparent member and may serve as an antireflective infrared cut filter coating.

The thin-film interference filter may include thin-film dielectric layers with alternating high and low indexes of refraction. In particular, the thin-film interference filter may have high transmission across visible wavelengths at both high and low angles of view, and may be neutral in transmitted color at high and low angles. Moreover, the thin-film interference filter may reduce transmission of infrared light through the transparent member at both high and low angles.

The thin-film interference filter may be applied as an antireflective infrared cut filter coating over one or more optical components in the electronic device, and may reduce an amount of infrared light that reaches the optical components. This may allow the optical components to produce more accurate data in response to ambient light.

DETAILED DESCRIPTION

Electronic devices and other items may be provided with transparent structures such as sapphire, other transparent crystalline materials, glass, and other transparent materials. Antireflective infrared cut filter coatings may be formed on the transparent structures to reduce an amount of infrared light passing through the coatings and to reduce light reflections. Illustrative configurations in which antireflective infrared cut filter coatings are provided on transparent members for electronic devices such as transparent layers in displays and windows for cameras and other light-based devices may sometimes be described herein as an example. In general, however, antireflective infrared cut filter coatings may be formed on any suitable transparent members.

Figure 1:
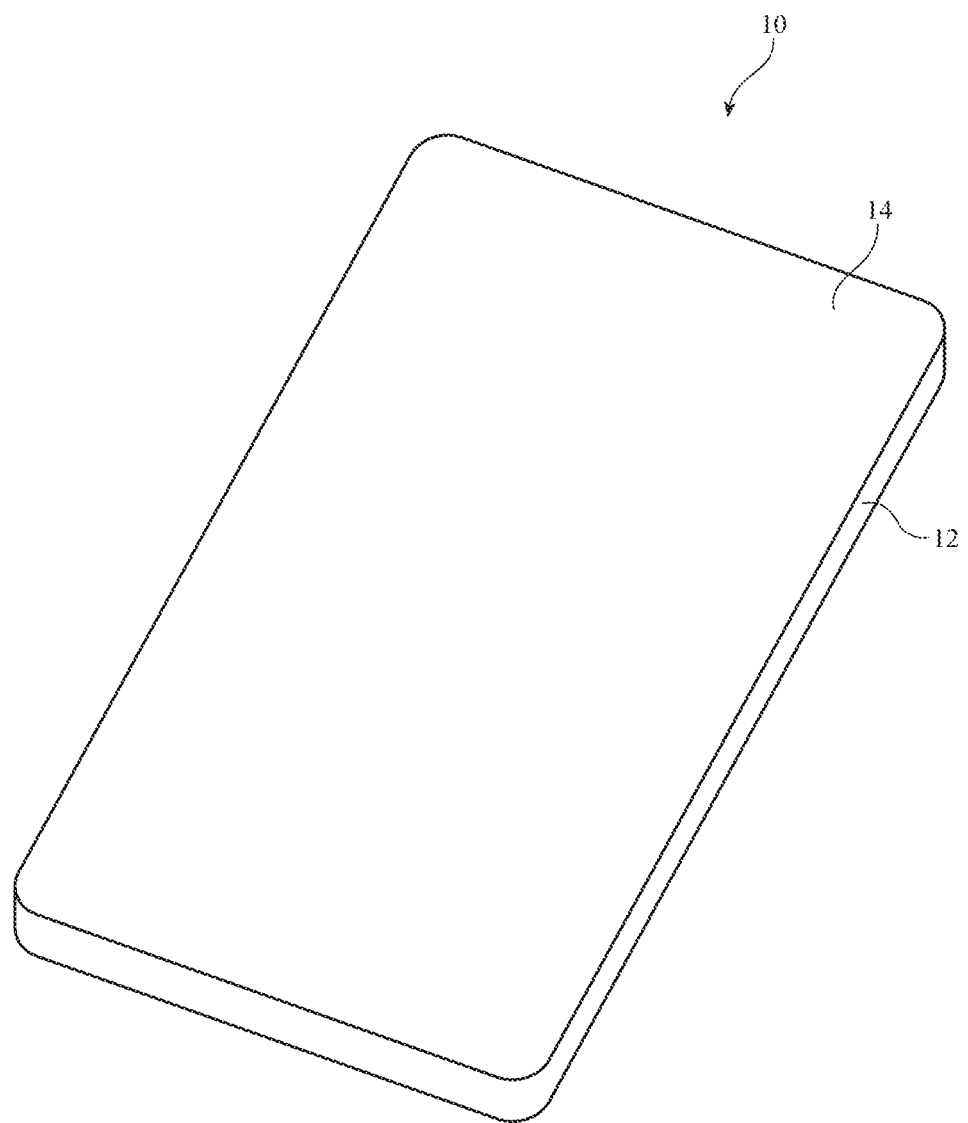
FIG. 1 is a perspective view of an illustrative electronic device of the type that may include transparent members with antireflective infrared cut filter coatings in accordance with an embodiment.

An illustrative electronic device of the type that may be provided with transparent members having antireflective infrared cut filter coatings is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. In particular, display 14 (or a transparent cover layer that covers display 14) may be mounted in housing 12 and form at least a portion of a front surface of device 10. Although not shown in FIG. 1, device 10 may also have an opposing rear surface formed by housing 12.

Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may include one or more layers of transparent material. For example, the outermost layer of display 14, which may sometimes be referred to as a display cover layer, may be formed from a hard transparent material help protect display 14 from damage. Illustrative configurations in which a display cover layer and other transparent members in device 10 (e.g., windows for cameras and other light-based devices) are formed from a hard transparent crystalline material such as sapphire (sometimes referred to as corundum or crystalline aluminum oxide) may be described herein as an example. Sapphire makes a satisfactory material for display cover layers and windows due to its hardness (9 Mohs). In general, however, these transparent members may be formed from any suitable material.

A display cover layer for display 14 may planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, or to form audio ports (e.g., openings for speakers and/or microphones), as examples.

Antireflective infrared cut filter coatings (also referred to as antireflective infrared cut coatings herein) may be formed on display cover layers to reduce reflections to help users view images on display 14 and reduce an amount of infrared light that reaches display 14 to prevent overheating of display 14. Antireflective infrared cut filter coatings may also be formed on transparent windows for underlying optical components in device 10 to prevent reflections and infrared light from interfering with the optical components. However, these examples are merely illustrative. In general, antireflective infrared cut filter coatings may be applied to any transparent or partially transparent layer in an electronic device, whether or not that layer is exposed to an exterior of the device.

Figure 2:
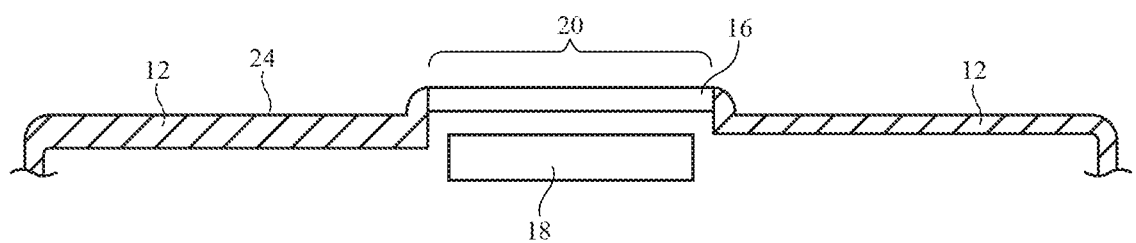
FIG. 2 is a cross-sectional side view of an illustrative electronic device window such as a camera window that may be provided with an antireflective infrared cut filter coating in accordance with an embodiment.

A cross-sectional side view of an illustrative window in a portion of device 10 is shown in FIG. 2. As shown in FIG. 2, device 10 may have housing 12. Light-based component 18 (e.g., an optical component) may be mounted in alignment with opening 20 in housing 12. Opening 20 may be circular, may be rectangular, may be square, may have an oval shape, may have a triangular shape, may have other shapes with straight and/or curved edges, or may have other suitable shapes (outlines when viewed from above). Window 16 may be mounted in opening 20 of housing 12 so that window 16 overlaps component 18. A gasket, bezel, adhesive, screws, or other fastening mechanisms may be used in attaching window 16 to housing 12. A top surface of window 16 may lie flush with surface 24 of housing 12, may be recessed below surface 24, or may, as shown in FIG. 2, be proud of surface 24 (i.e., the top surface of window 16 may lie in a plane that is some distance away from surface 24 in direction 26). Surface 24 may form the rear face of housing 12, a portion of the front face of housing 12, or other suitable portion of housing 12.

Light-based device 18 may be based on one or more components that emit light (e.g., a light-emitting diode, a laser, a lamp, etc.) and/or one or more components that detect light (e.g., an image sensor that captures digital images through a lens, a proximity sensor detector that measures infrared light from an infrared emitter that has reflected off of external objects adjacent to device 10, an ambient light sensor that measures the intensity and/or color of ambient light, or other light producing and/or light measuring circuitry). With one illustrative configuration, window 16 is a circular window and device 18 includes a rectangular image sensor and a lens that is interposed between the circular window and the rectangular image sensor. Other types of light-based devices may be aligned with windows such as illustrative window 16 of FIG. 2. The configuration of FIG. 2 is merely illustrative.

Transparent members for device 10 such as a display cover glass in display 14 or a transparent substrate in window 16 may be formed from a durable material such as sapphire or other hard crystalline materials. Hard materials (particularly materials such as sapphire with a Mohs hardness of 9 or more, but also materials that are softer such as materials with a hardness of 8 Mohs or more or other suitable hard materials) will tend to resist scratches when the transparent members are subject to wear from normal use. Illustrative configurations in which the transparent members for device 10 (e.g., display cover layers for displays such as display 14, windows such as window 16 of FIG. 2, etc.) are formed from sapphire (i.e., crystalline aluminum oxide) are sometimes described herein as an example. In general, however, these transparent structures may be formed from any suitable materials, such as glass.

Sapphire has a relatively large refractive index (1.8), which causes sapphire structures to reflect light. Light reflections can make it difficult to view images on display 14 and can interfere with image capture operations and other operations using windows 16. Moreover, underlying optical components, such as device 18, may be sensitive to infrared light. In one example, device 18 may be a camera or other optical component. Although camera 18 may capture light at visible wavelengths to form an image, camera 18 may also detect infrared light, thereby undesirably altering the image. To suppress light reflections and to reduce infrared light reaching device 18 (or other underlying device), transparent sapphire members may be provided with antireflective infrared cut filter coatings.

Figure 3:
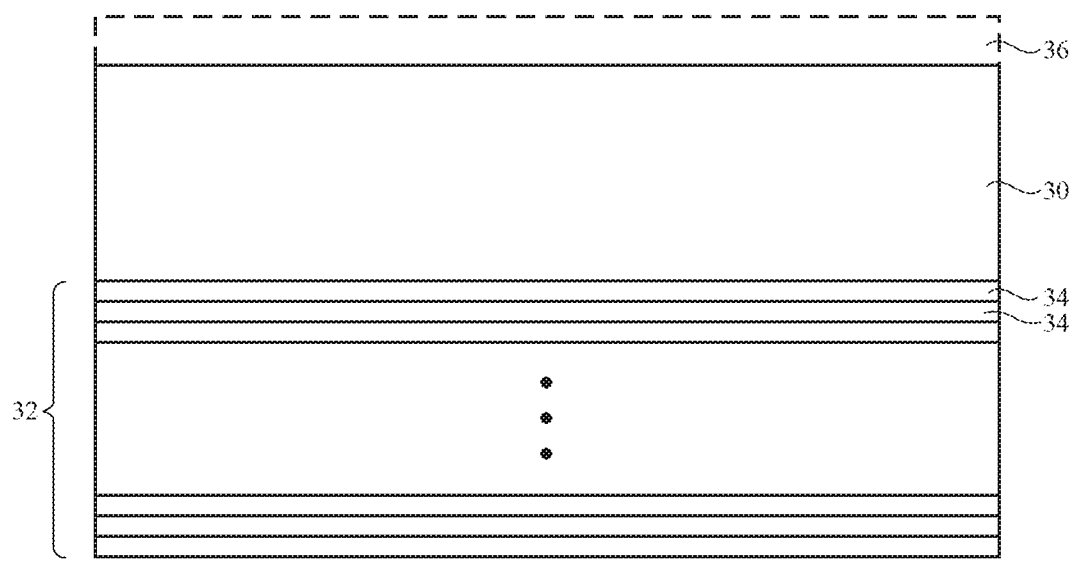
FIG. 3 is a cross-sectional side view of an illustrative antireflective infrared cut filter coating in accordance with an embodiment.

An illustrative antireflective cut filter coating is shown in FIG. 3. As shown in FIG. 3, transparent substrate 30, which may be used to form transparent window 16, a transparent cover over display 14, or any other desired portion of device 10, may be provided with an antireflective cut filter coating in the form of thin-film interference filter 32. Thin-film interference filter 32 (e.g., the antireflective cut filter coating) may be formed in the interior of the electronic device or on the exterior of the electronic device. In other words, transparent substrate 30 may have a surface that faces the exterior and a surface that faces the interior, and thin-film interference filter 32 may be provided on either an inner surface or an outer surface of transparent substrate 30.

Transparent substrate 30 may be formed from sapphire, as an example, and may be a planar member. However, in general, transparent substrate 30 may be formed from any desired transparent material and may have any desired shape.

Although thin-film interference filter 32 is shown as being directly on transparent substrate 30, this is merely illustrative. In general, polymer buffer layers, metal buffer layers, or other desired buffer layers may be provided between transparent substrate 30 and thin-film interference filter 32. This may be desirable when transparent substrate 30 is formed from a material having a lower hardness than sapphire (e.g., to protect a glass substrate). However, this is merely illustrative. Buffer layers may be used to prevent damage to any desired transparent substrate.

Thin-film interference filter 32 may include multiple thin-film dielectric layers 34 of alternating high and low indexes of refraction, which may produce interference effects when light passes into filter 32 from layer 30. Layers 34 may have thicknesses of 0.01-1 micron, at least 0.05 microns, at least 0.1 microns, at least 0.15 microns, less than 1.5 microns, less than 1 micron, less than 10 nm, at least 8 nm, etc. Layers 34 may be inorganic dielectric layers (e.g. oxides such as silicon oxide, niobium oxide, titanium oxide, tantalum oxide, zirconium oxide, magnesium oxide, etc., nitrides such as silicon nitride, oxynitrides, and/or other inorganic dielectric materials). Organic dielectric layers (e.g., clear polymer layers) and/or other materials (thin metal films, semiconductor layers, etc.) may also be included in the thin-film stack, if desired. In general, thin-film stack 32 may be formed from any desired number of layers 34 that have any desired individual thicknesses. In this way, thin-film stack 32 may be tuned to have desirable optical properties.

Filter 32 may include more than 60 thin-film layers, more than 70 thin-film layers, fewer than 90 thin-film layers, or more than 80 thin-film layers, as examples. In general, thin-film interference filter 32 may be formed from any number thin-film layers 34 of any desired materials to provide desired optical properties. For example, thin-film interference filter 32 may be formed from seventy alternating silicon oxide ($SiO_2$) and niobium oxide ($Nb_2O_5$) layers of varying thickness to form an antireflective infrared cut filter coating on transparent substrate 30. These alternating $SiO_2$ and $Nb_2O_5$ layers may range in thickness between 12 nm and 175 nm, as an example. However, this is merely illustrative. Any desired materials, number of thin-film layers, layer thicknesses, and types of thin-film layer materials may be used to form an antireflective infrared cut filter coating.

In general, thin-film interference filter 32 may be formed using any desired process. For example, one or more layers of thin-film interference filter 32 may be applied using physical vapor deposition (PVD). In cases where thin-film interference filter 32 is applied using PVD processes, it may be desirable to apply a buffer layer between transparent layer 30 and thin-film interference filter 32 to prevent damage to transparent layer 30 during PVD.

If desired, transparent substrate 30 may include optional layer(s) 36 on a surface opposite thin-film interference filter 32. Optional layers 36 may include oleophobic coating layers, anti-scratch layers, or any other desired layers.

Although not shown in FIG. 3, additional layers may be provided below thin-film interference filter 32, if desired. For example, metal support layers, dielectric support layers, internal housing layers, or any other desired layers may be formed beneath thin-film interference filter 32. Moreover, additional layers may be provided between thin-film interference filter 32 and transparent substrate 30, if desired. For example, one or more ink layers, masking layers, additional transparent layers (e.g., sapphire, glass layers, or any other desired transparent layers) or any other desired layers may be formed between thin-film interference filter 32 and transparent substrate 30.

Figure 4:
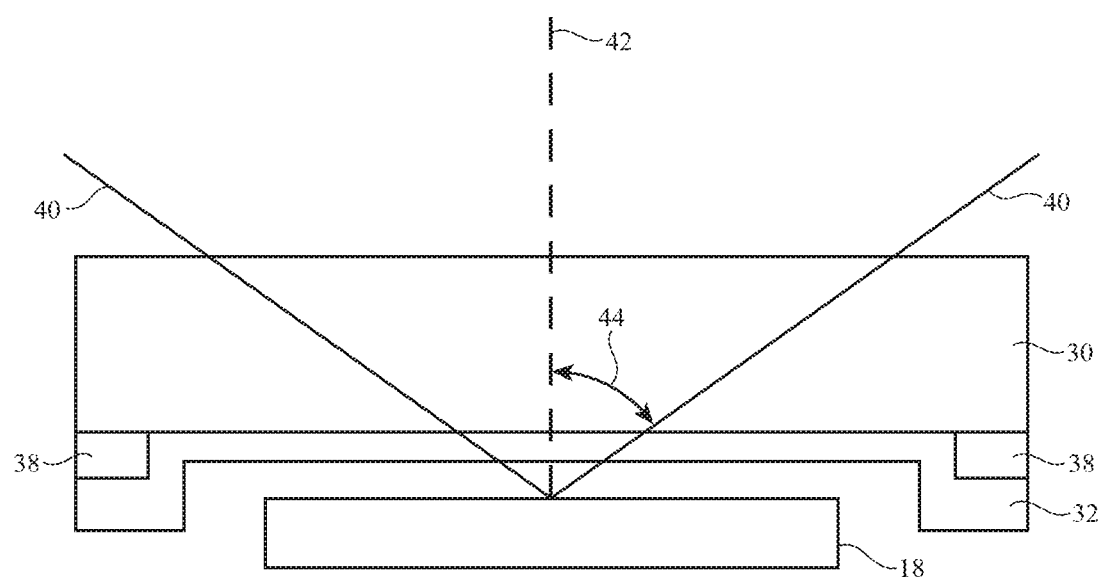
FIG. 4 is a cross-sectional side view of an illustrative electronic device window having an antireflective infrared cut filter coating overlying an optical component in accordance with an embodiment.

In some embodiments, it may be desirable to apply antireflective infrared cut filter coating 32 over an optical component, such as a camera. As shown in FIG. 4, transparent substrate 30, which may be sapphire, may overlap optical component 18. Optical component 18 may be a camera, such as a wide-angle camera. For example, camera 18 may have a field-of-view 40, which may offset from normal axis 42 by angle 44. Angle 44 may be greater than 40°, greater than 50°, greater than 60°, less than 70°, or greater than 65°, which may respectively correspond to fields-of-view of greater than 80°, greater than 100°, greater than 120°, less than 140°, or greater than 130°. In one embodiment, camera 18 may be a wide-angle camera with a field-of-view 40 that extends 60° on either side of normal axis 42. In other words, the wide-angle camera may have a field-of-view of 120°.

To prevent reflections and infrared light from interfering with camera 18, sapphire substrate 30 may be provided with antireflective infrared cut filter coating 32. Black mask 38 may be provided to ensure that off-angle light (e.g., light at angles greater than field-of-view 40) does not reflect into camera 18 and interfere with the image data generated by camera 18. Black mask 38 may be formed from any desired ink layers, pigment layers, thin-film layers, or other desired layers. In some embodiments, mask 38 may be an opaque mask of any desired color, rather than a black mask.

As described above in connection with FIG. 3, the antireflective infrared cut filter coating (e.g., the coating formed from thin-film interference filter 32) may be formed from a plurality of thin-film layers that may cause interference effects when light passes from sapphire substrate 30 into coating 32. Antireflective infrared cut filter coating 32 may maintain a constant transmission of light across visible wavelengths at a given angle. For example, antireflective infrared cut filter coating 32 may have maintain a constant transmission of light across visible wavelengths at 10°, may have a constant transmission of light across visible wavelengths at 20°, and may have a constant transmission of light across visible wavelengths at 65°, as examples. In this way, although an amount of transmission may decrease at larger angles, antireflective infrared cut filter coating 32 may exhibit flat transmission profiles in visible wavelengths at any desired angle (e.g., up to angle 44). Moreover, antireflective infrared cut filter coating 32 may reduce an amount of infrared light that reaches camera 18 across those angles.

Although antireflective infrared cut filter coating 32 has been shown as being applied to transparent substrate 30, which forms a rear surface of an electronic device, this is merely illustrative. In general, antireflective cut filter coating 32 may be applied to any desired transparent surface within device 10. For example, antireflective infrared cut filter coating 32 may be applied within a camera module (e.g., within camera 18), may be applied to another piece of transparent material (e.g., sapphire or glass) that is interposed between transparent substrate 30 and optical component 18, or may be applied to any other desired transparent or semi-transparent surface.

Figure 5:
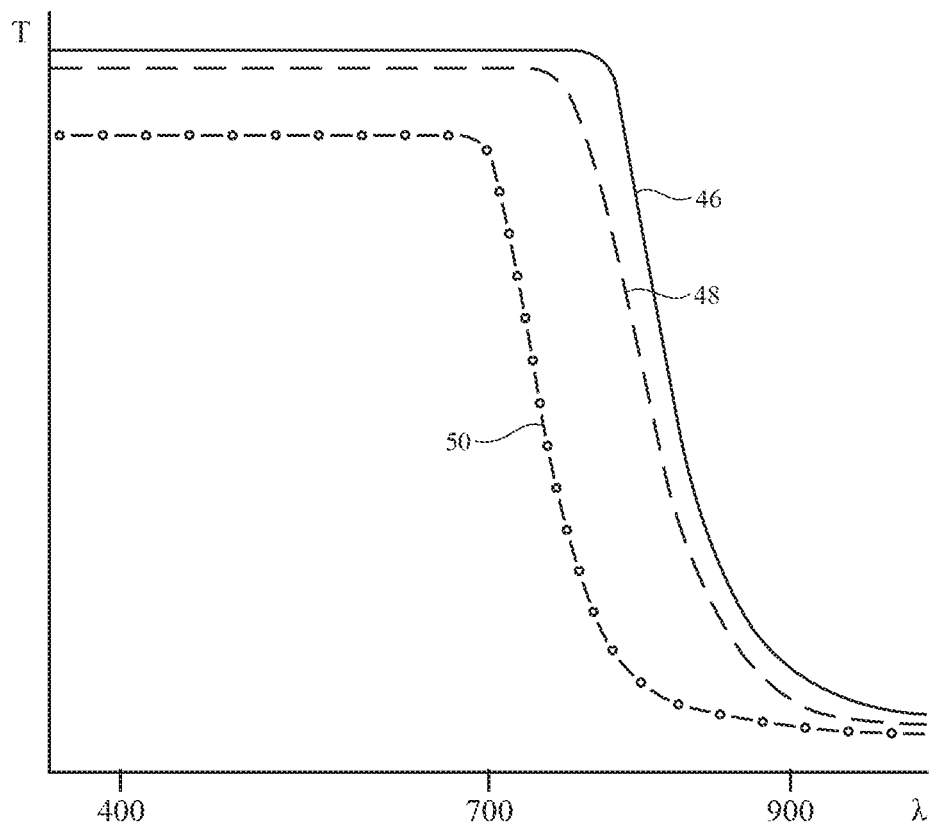
FIG. 5 is a diagram of illustrative transmission profiles through an antireflective infrared cut filter coating at different angles of incident light in accordance with an embodiment.

FIG. 5 is a diagram showing illustrative transmission profiles through antireflective infrared cut filter coating 32 at different angles (e.g., angles of light incident on coating 32 when measured from a normal axis, such as normal axis 42 in FIG. 4). As shown by transmission profile 46 in FIG. 5, antireflective infrared cut filter coating 32 may transmit light at visible wavelengths (e.g. between 400 nm and 700 nm) and may reflect light (e.g., exhibit low transmission) at infrared wavelengths (e.g., between 900 nm and 1000 nm). Transmission profile 46 may correspond to light incident on coating 32 at 0°, greater than 0°, greater than 10°, less than 15°, or greater than 20°, as examples.

At a 0° angle (e.g., an angle along normal axis 42), coating 32 may transmit more than 80% of incident light, more than 85% of incident light, less than 92% of incident light, or more than 87% of incident light across visible wavelengths. Across infrared wavelengths, coating 32 may transmit less than 10%, greater than 2%, less than 8%, or less than 15% of light incident on coating 32 at a 0° angle. In this way, coating 32 may be antireflective (e.g., may transmit a high percentage of light across visible wavelengths) and may be an infrared cut filter (e.g., may transmit a low percentage of light across infrared wavelengths).

Transmission profile 48 shows light transmission through coating 32 at moderate angles. For example, transmission profile 48 may correspond to light incident on coating 32 at 45°. However, this is merely illustrative. In general, transmission profile 48 may correspond to other angles, such as angles greater than 30°, greater than 40°, greater than 50°, or less than 55°, as examples.

At a 45° angle of incidence, coating 32 may transmit more than 80% of incident light, more than 84% of incident light, less than 90% of incident light, or more than 87% of incident light across visible wavelengths. Across infrared wavelengths, coating 32 may transmit less than 10%, greater than 2%, less than 8%, or less than 15% of light incident at 45° angles. In this way, coating 32 may retain its antireflective and cut filter properties at angles above 0°.

Transmission profile 50 shows light transmitted through coating 32 at high angles. For example, transmission profile 50 may correspond to light incident on coating 32 at 65°, which may correspond to a maximum angle of the field-of-view of underlying camera 18. However, this is merely illustrative. In general, transmission profile 50 may correspond to other angles, such as angles greater than 60°, greater than 62°, or less than 65°, as examples.

At a 65° angle of incidence, coating 32 may transmit more than 70% of incident light, more than 75% of incident light, more than 85%, more than 90%, less than 92%, less than 80% of incident light, or more than 77% of incident light across visible wavelengths. Across infrared wavelengths, coating 32 may transmit less than 20%, greater than 18%, less than 30%, or less than 35% of light incident at 65° angles. In this way, coating 32 may retain antireflective properties at 65° and still reduce the amount of infrared light that passes through the coating.

As shown by transmission profiles 46, 48, and 50 in FIG. 5, coating 32 may exhibit high, constant transmission across visible wavelengths at both low and high angles of incidence. In particular, having constant transmission across visible wavelengths allows for the coating to be color neutral in transmitted light. A diagram illustrating the color neutrality of coating 32 across incident angles is shown in FIG. 6.

Figure 6:
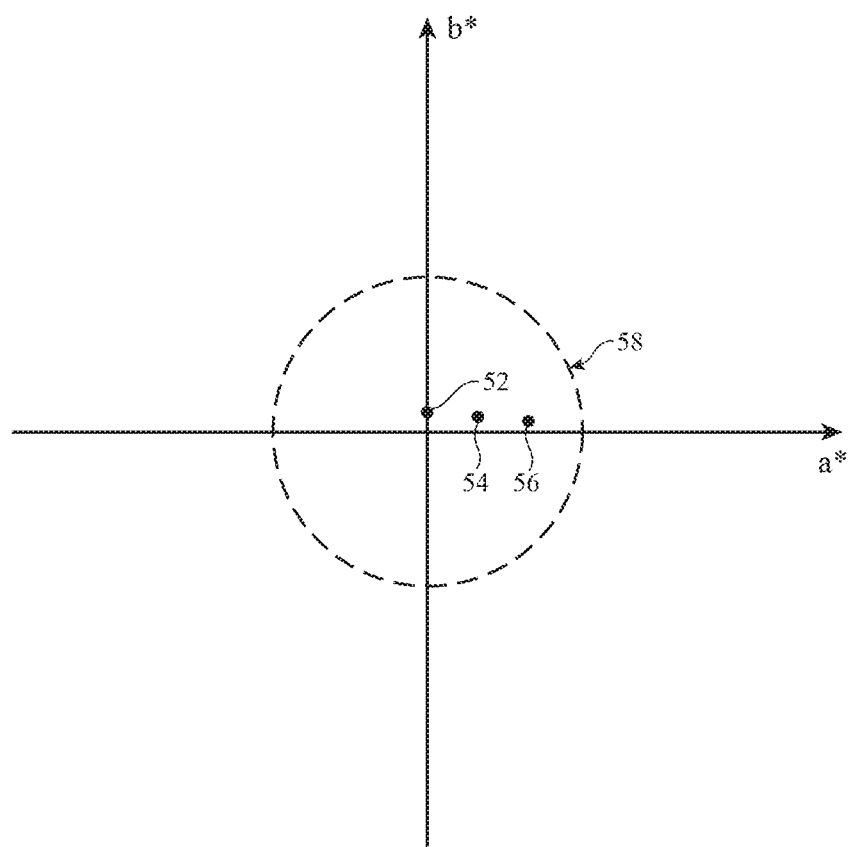
FIG. 6 is a diagram of illustrative color profiles that are transmitted through an antireflective infrared cut filter coating at different angles of incident light in accordance with an embodiment.

As shown in FIG. 6, the color transmitted through antireflective infrared cut filter coating 32 may be characterized by a color in CIELAB color space (also referred to as LAB color space herein). In particular, the color of light transmitted through coating 32 may be characterized by LAB color coordinates a* and b* (also referred to as color coordinates a and b herein). Point 52 may represent the color of light transmitted by coating 32 at 0° (e.g., light incident on coating 32 along a normal axis) or other low angles of incidence. As shown, the color transmitted at 0° may have a b* component, but no a* component. The b* component may be less than 0.5 in magnitude, less than 0.4 in magnitude, greater than 0.1 in magnitude, or less than 0.3 in magnitude, as examples. As a result, light with a yellow tint may be transmitted by coating 32 at 0°. However, this is merely illustrative. In general, the color transmitted at 0° may have any b* component and any a* component. In some cases, the a* component may also be less than 0.5 in magnitude, less than 0.4 in magnitude, greater than 0.1 in magnitude, or less than 0.3 in magnitude at 0°, as examples.

At higher angles of incidence, the color transmitted through coating 32 may shift to values with lower b* components, but with higher a* components (e.g., the transmitted color may be more red than the light transmitted at 0°). However, because of the neutral nature of antireflective infrared cut filter coating 32, the shift may be minimal.

Point 54 may represent the color of light transmitted by coating 32 at 45° (or other moderate angle of incidence), and point 56 may represent the color of light transmitted by coating 32 at 65° (or other high angle of incidence). In one embodiment, point 56 may represent light transmitted at angle corresponding to the field-of-view of an underlying component, such as a wide-angle camera.

As shown in FIG. 6, each of points 52, 54, and 56 may be inside of circle 58, which may be a circle with a radius less than 1, less than 2, greater than 3, or less than 5, as examples. Therefore, coating 32 may exhibit a root sum squared difference of color coordinates a and b less than 1, less than 2, or less than 5 over incident angles from 0° to 65°, over incident angles from 0° to 60°, or over incident angles from 0° to 70°, as examples. In other words, coating 32 may have a maximum change of less than 2 in magnitude in the a* and b* components of LAB color space over incident angles from 0° to 65°. In some embodiments, antireflective infrared cut filter coating 32 may be neutral in transmitted color (e.g., having a and b components less than 1 in magnitude) over all incident angles within an angle-of-view of an underlying optical component, such as a wide-angle camera having a maximum angle-of-view of 65° from normal.

The antireflective infrared cut filter coating may reduce reflections and reduce an amount of infrared light that reaches underlying components. In some cases, the antireflective infrared cut filter coating may reduce solar flaring (e.g., the phenomenon of optical components producing image artifacts in response to ambient infrared light). Alternatively or additionally, the antireflective infrared cut filter coating may reduce infrared light produced by other components and reflected or refracted within the electronic device from interfering with optical components. An example of this arrangement is shown in FIG. 7.

Figure 7:
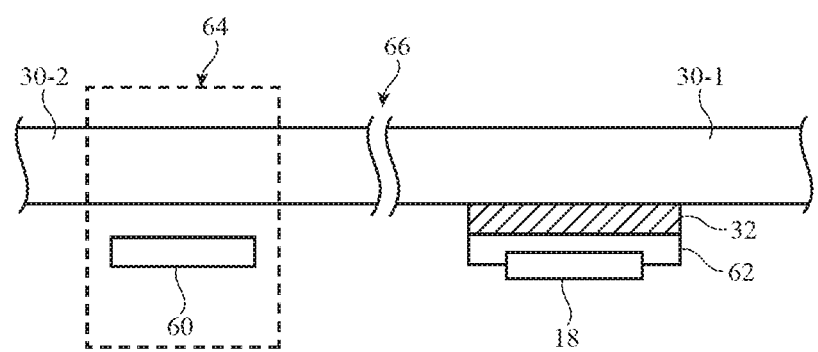
FIG. 7 is a cross-sectional side view of an illustrative electronic device having an infrared-emitting component and an optical component with an overlying antireflective infrared cut filter coating in accordance with an embodiment.

As shown in FIG. 7, transparent substrate portion 30-1 (e.g., a portion of a sapphire substrate, glass substrate, or other desired transparent or semi-transparent substrate) may overlap optical component 18, which may be a camera, an ambient light sensor, or any other desired optical component. Moreover, transparent substrate portion 30-2 may overlap infrared component 60. Infrared component 60 may emit infrared light through transparent substrate portion 30-2 and may be, for example, an infrared emitter in a proximity sensor system or an infrared dot projector. However, these are merely illustrative. In general, infrared component 60 may be any component in an electronic device that emits infrared light through transparent substrate portion 30-2.

During operation of infrared component 60 and optical component 18, some of the infrared light emitted by infrared component 60 may be refracted and/or reflected by transparent substrate portion 30-2, transparent substrate portion 30-1, other components in device 10, or external objects and reach optical component 18. As an example, some of the infrared light may internally reflect or be scattered within substrate portions 30-1 and 30-2 and reach optical component 18. Alternatively, some of the infrared light emitted by infrared component 60 may be reflected by one or more external objects and be detected by optical component 18. Optical component 18 may be sensitive to this infrared light, and data produced by optical component 18 may have undesired artifacts due to the detection of the infrared light.

To reduce an amount of infrared light that reaches optical component 18, antireflective infrared cut coating 32 may be used between transparent substrate portion 30-1 and optical component 18. An amount of infrared light emitted by infrared component 60 and/or infrared ambient light that reaches optical component 18 may be reduced. In this way, antireflective infrared cut coating 32 may reduce unwanted artifacts within images and/or data generated by optical component 18.

As shown in FIG. 7, optional section 64, which includes infrared component 60, may be omitted, if desired. Moreover, infrared component 60 may be under the same substrate as optical component 18 (e.g., substrate portion 30-1 and substrate portion 30-2 form portions of the same substrate), or infrared component 60 may be under a different substrate than optical component 18 (e.g., substrate portion 30-1 forms part of a first substrate and substrate portion 30-2 forms part of a different, second substrate). Moreover, substrate portions 30-1 and 30-2 may be located on the same face of electronic device 10 (e.g., the front face), or may be located on different faces of electronic device 10 (e.g., substrate portion 30-1 may form a portion of the rear face and substrate portion 30-2 may form a portion of the front face). In general, optional section 64 may be located in any desired portion of device 10 relative to optical component 18.

In some cases (e.g., when substrate portion 30-1 and substrate portion 30-2 form portions of the same substrate), it may be desirable to include a gap or material between substrate portions 30-1 and 30-2. As shown in FIG. 7, region 66 may separate substrate portion 30-1 from substrate portion 30-2. In some embodiments, region 66 may include masking material, such as ink. In other embodiments, other components may be present under substrate 30 in region 66. However, these examples are merely illustrative. In general, infrared component 60 and optical component 18 may be located in any desired locations within device 10.

Although antireflective infrared cut coating 32 is shown between optical component 18 and transparent substrate 30 (e.g., in the interior of a corresponding electronic device), this is merely illustrative. Coating 32 may be applied on the exterior of an electronic device, on an opposite surface of transparent surface 30, if desired.

Although sometimes illustrated in the context of sapphire members with antireflective infrared cut filter coatings, other transparent crystalline materials or other transparent materials (e.g., glass, plastic, etc.) more broadly may serve as transparent members in device 10 and may be coated with antireflective infrared cut filter coatings. Moreover, although coating 32 has been described as coating transparent cover layers for a display and as coating optical windows, coating 32 may be applied to any desired transparent surface within an electronic device.

While antireflective infrared cut coating 32 has been described as being neutral (or near-neutral) in transmitted color (e.g., in connection with FIG. 6), antireflective infrared cut coating 32 may also be neutral or near-neutral in reflected color. A diagram illustrating the color neutrality of reflected light of coating 32 is shown in FIG. 8.

Figure 8:
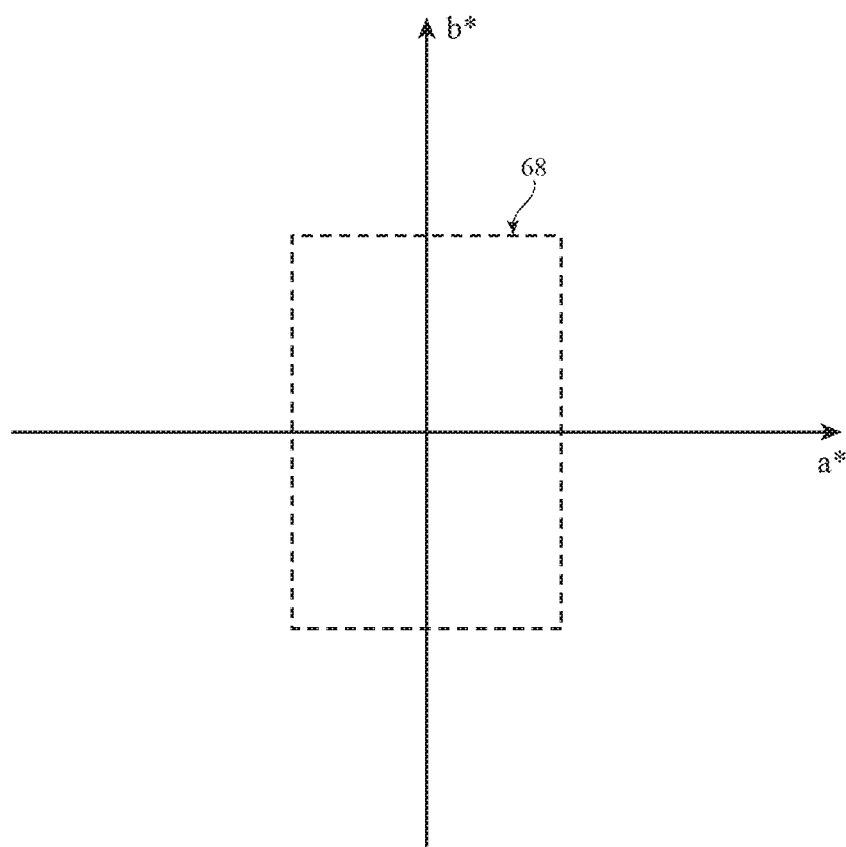
FIG. 8 is a diagram of a range of illustrative color profiles that are reflected by an antireflective infrared cut filter coating in accordance with an embodiment.

As shown in FIG. 8, color reflected by antireflective infrared cut filter coating 32 may be characterized by a color in CIELAB color space (also referred to as LAB color space herein). In particular, the color of light reflected by coating 32 may be characterized by LAB color coordinates a* and b* (also referred to as color coordinates a and b herein). Color reflected by antireflective infrared cut filter coating 32 may be bounded within box 68 across viewing angles from 0° to 65° (e.g., when measured from normal axis 42). For example, box 68 may be bound between a components of −0.5 and +0.5 and between b components of −1.70 and +1.0 over the 0° to 65° viewing angle range. As an example, reflected light may have a components between −0.5 and +0.5 and b components between −1.70 and +1.0 at a 10° viewing angle. The values of these a and b components may be measured from a nominal value, which may correct from any systematic error in a measurement tool. In this way, the a component of reflected light may have a minimum value of −0.5 and a maximum value of 0.5 from a nominal value over this range, and the b component of reflected light may have a minimum value of −1.70 and a maximum value of 1.0 from a nominal value over this range. For example, with a nominal a* value of 0.3 and a nominal b* value of −1.3, the reflected light may have an a component between −0.2 and 0.8, and a b component between −3.0 and −0.3. However, the bounds of box 68 are merely illustrative. In general, antireflective infrared cut filter coating 32 may have any desired minimum and maximum values in the a and b components in LAB color space of reflected light. Additionally, these minimum and maximum values are not limited to viewing angles between 0° and 65°. The viewing angle range to which light reflected by antireflective infrared cut filter coating 32 is bound by box 68 may from 0° to 65°, from 0° to 60°, or from 0° to 70°, as examples.

The foregoing is merely illustrative and various modifications can be made to the described embodiments. The foregoing embodiments may be implemented individually or in any combination.

What is claimed is:

1. An electronic device, comprising:
    a housing;
    a display in the housing;
    an optical component in the housing;
    a transparent substrate that overlaps the optical component; and
    an antireflective infrared cut filter coating on the transparent substrate, wherein transmitted light through the antireflective infrared cut filter coating exhibits a maximum shift of less than 2 in magnitude in the a and b coordinates of LAB color space across incident angles from 0° to 65°.

2. The electronic device defined in claim 1 wherein the antireflective infrared cut filter coating comprises a thin-film interference filter formed from a plurality of thin-film layers.

3. The electronic device defined in claim 2 wherein the transparent substrate is a sapphire substrate.

4. The electronic device defined in claim 3 wherein the optical component is a wide-angle camera having a field-of-view of at least 120°.

5. The electronic device defined in claim 4 wherein the antireflective infrared cut filter coating is interposed between the sapphire substrate and the wide-angle camera.

6. The electronic device defined in claim 5 further comprising:
opaque masking material interposed between a portion of the antireflective infrared cut filter coating and the wide-angle camera, wherein the opaque masking material surrounds an opening that overlaps the wide-angle camera.

7. The electronic device defined in claim 4 wherein the sapphire substrate is interposed between the antireflective infrared cut filter coating and the wide-angle camera.

8. The electronic device defined in claim 4 wherein the thin-film interference filter comprises at least seventy thin-film layers with alternating high and low indexes of refraction.

9. The electronic device defined in claim 8 wherein the thin-film interference filter comprises alternating niobium oxide layers and silicon oxide layers.

10. The electronic device defined in claim 2 wherein the optical component is a camera, the electronic device further comprising:
an infrared-emitting component adjacent to the camera, wherein the antireflective infrared cut filter coating blocks light emitted by the infrared-emitting component and scattered by the transparent substrate from reaching the camera.

11. The electronic device defined in claim 10 wherein the antireflective infrared cut filter coating overlaps the camera without overlapping the infrared-emitting component.

12. The electronic device defined in claim 1 wherein light reflected by the antireflective infrared cut filter coating has a component between −0.5 and 0.5 measured from a nominal a value and a b component between −1.7 and 1.0 measured from a nominal b value in LAB color space between 0° and 65°.

13. An apparatus having an interior and an exterior, the apparatus comprising:
a wide-angle camera;
a transparent layer having a first surface facing the exterior and an opposing second surface facing the interior, wherein the transparent layer overlaps the wide-angle camera; and
an antireflective infrared cut filter coating on the transparent layer, wherein the antireflective infrared cut filter coating transmits more than 70% of light across visible wavelengths at incident angles from 0° to 65°.

14. The apparatus defined in claim 13 further comprising:
a housing having a front surface and a rear surface; and
a display on the front surface of the housing.

15. The apparatus defined in claim 14 wherein the transparent layer forms a portion of the rear surface of the housing.

16. The apparatus defined in claim 14 wherein the transparent layer forms at least a portion of the front surface of the housing.

17. The apparatus defined in claim 16 further comprising:
an infrared component mounted in the housing, wherein the antireflective infrared cut filter coating blocks at least some infrared light emitted by the infrared component and reflected by the transparent layer.

18. The apparatus defined in claim 14 wherein the antireflective infrared cut filter coating comprises a thin-film interference filter formed from thin-film dielectric layers with alternating high and low indexes of refraction, and wherein the antireflective infrared cut filter coating transmits more than 87% of light across visible wavelengths at an incident angle of 0°.

19. The apparatus defined in claim 18 wherein the antireflective infrared cut filter coating transmits more than 84% of light across visible wavelengths at incident angles from 0-45°.

20. An electronic device, comprising:
a housing having a front surface and an opposing rear surface;
a display mounted in the housing;
a transparent layer that overlaps the display and that forms the front surface;
a first camera overlapped by the transparent layer;
a sapphire layer in an opening in the rear surface of the housing;
a second camera overlapped by the sapphire layer; and
an antireflective infrared cut filter layer on the sapphire layer, wherein the antireflective infrared cut filter layer transmits more than 70% of light across visible wavelengths at incident angles from 0° to 65°.

21. The electronic device defined in claim 19 wherein the antireflective infrared cut filter layer comprises a thin-film interference filter and transmits light that exhibits a maximum shift of less than 2 in magnitude in the a and b coordinates of LAB color space between 0° and 65° incidence angles.

* * * * *